INVENTORS
ROBERT T. CHIEN
JACK J. STEIN

BY Bernard N. Wiener
ATTORNEY 3,353,155

ERROR CONTROL OF DIGITAL INFORMATION SIGNALS WITH INHERENT INFORMATION REDUNDANCY

Robert T. Chien, Yorktown Heights, and Jack J. Stein, Bronx, N.Y., assignors to International Business Machines Corporation, New York, N.Y., a corporation of New York Filed Dec. 30, 1963, Ser. No. 334,178
15 Claims. (Cl. 340—146.1)

This invention relates to error control of digital information signals with inherent information redundancy; and it relates more particularly to error detection and correction of digital information signals characterized as sequences of digital symbols with a plurality of designators per symbol, the information part of the signals having balanced information redundancy.

Information signals are a physical representation of information, e.g., electrical waveforms or photographic images. The phrase "error control" as used herein indicates either error-detection or error-correction or both error-detection and error-correction for digital information signals. There is inherent redundancy in the information part of information signals when the content of the physical representation thereof is greater than required to convey an intended meaning, and the excess content repeates an aspect of the information. The phrase "information part" of information signals with inherent redundancy as used herein indicates the information content before the format of an error-correcting code is utilized to characterize the information signals for the practice of this invention. The information redundancy is balanced if the excess content repeats the information quantitatively e.g., the information is repeated twice for one hundred percent balanced redundancy. The balanced redundancy is integral if the information content per digit is repeated an integer number multiple.

In the art of digital information handling, an important purpose served by having redundancy in information signals is the detection and correction of errors which develop in the information signals during transmission or storage. Furthermore, when there is inherent redundancy in the signal representation of information before coding, it may be utilized to achieve simplification of coding hardware or enhancement of error protection. Inherent redundancy in information signals is often present as a result of physical properties of the digital system under consideration. The book "Error Correcting Codes" by W. W. Peterson published by John Wiley & Sons, Inc. in 1961 is illustrative of the literature on the technology of coding.

A physical control purpose relating to readout of information is served by the inherent redundancy in the information part of the information signals stored in a prior art photographic information storage device illustrated by the practice described in the article by G. W. King in the journal Control Engineering for August 1955 at page 48 et seq. By identifying a binary 1 as a dark mark followed by a light mark, and a binary 0 as a light mark followed by a dark mark, a control signal is obtained by an optical-electrical readout means to maintain tracking of successively stored digits by the reading mechanism. Thus, the inherent balanced information redundancy utilized for the tracking purpose is one hundred percent, i.e., the true and complement information streams comprised of alternate marks equally convey the intended meaning of the information part of the information signals. This technology may be used in many digital systems requiring a photoscopic memory. In particular this technology has been utilized to store the dictionary of an automatic language translator capable of providing satisfactory translation of Russian text material into English. An article in the journal Scientific American for June 1963 at page 124 et seq. describes recent status and potential of the technology.

The inherent balanced information redundancy of information signals for the language translator permits a limited amount of error-detection. Every pair of marks which should be complementary but are identical after transmission or storage indicates that an error has occurred at the particular digital position. However, it is impossible to determine from such a comparison what the intended binary digit actually is.

A conventional single parity check over both the true and complementary marks of a binary sequence provides a double error-detecting and single error-correcting code. This code may also be used to detect triple errors if no correction is desired. However, more powerful error-detecting and error-correcting procedures are desirable for information signals with an information part having balanced information redundancy.

Therefore, the primary object of this invention is to proivde error control of information signals with inherent information redundancy in the information part thereof.

It is another object of this invention to provide error control of information signals with inherent balanced information redundancy in the information part thereof.

It is another object of this invention to provide apparatus for error detection and correction of information signals whose information part is represented as sequences of digital symbols with a plurality of designators per symbol.

It is another object of this invention to provide apparatus for error detection and correction of information signals whose information part is represented as sequences of binary symbols with two designators or marks per binary digit.

It is another object of this invention to provide apparatus for error detection and correction of information signals whose information part is represented as sequences of binary symbols with two designators per symbol. The information signals are established in the format of an error correcting code, and the apparatus utilizes means in accordance with the error correcting code in cooperation with means for comparison of the true and complement streams.

It is another object of this invention to provide apparatus and method for error detection and correction for information signals whose information part has balanced information redundancy, which utilizes means in accordance with an error correcting code in cooperation with logic circuitry including threshold logic circuitry.

The foregoing and other objects, features and advantages of the invention will be apparent from the following more particular description of a preferred embodiment of the invention, as illustrated in the accompanying drawings.

Figure 2:
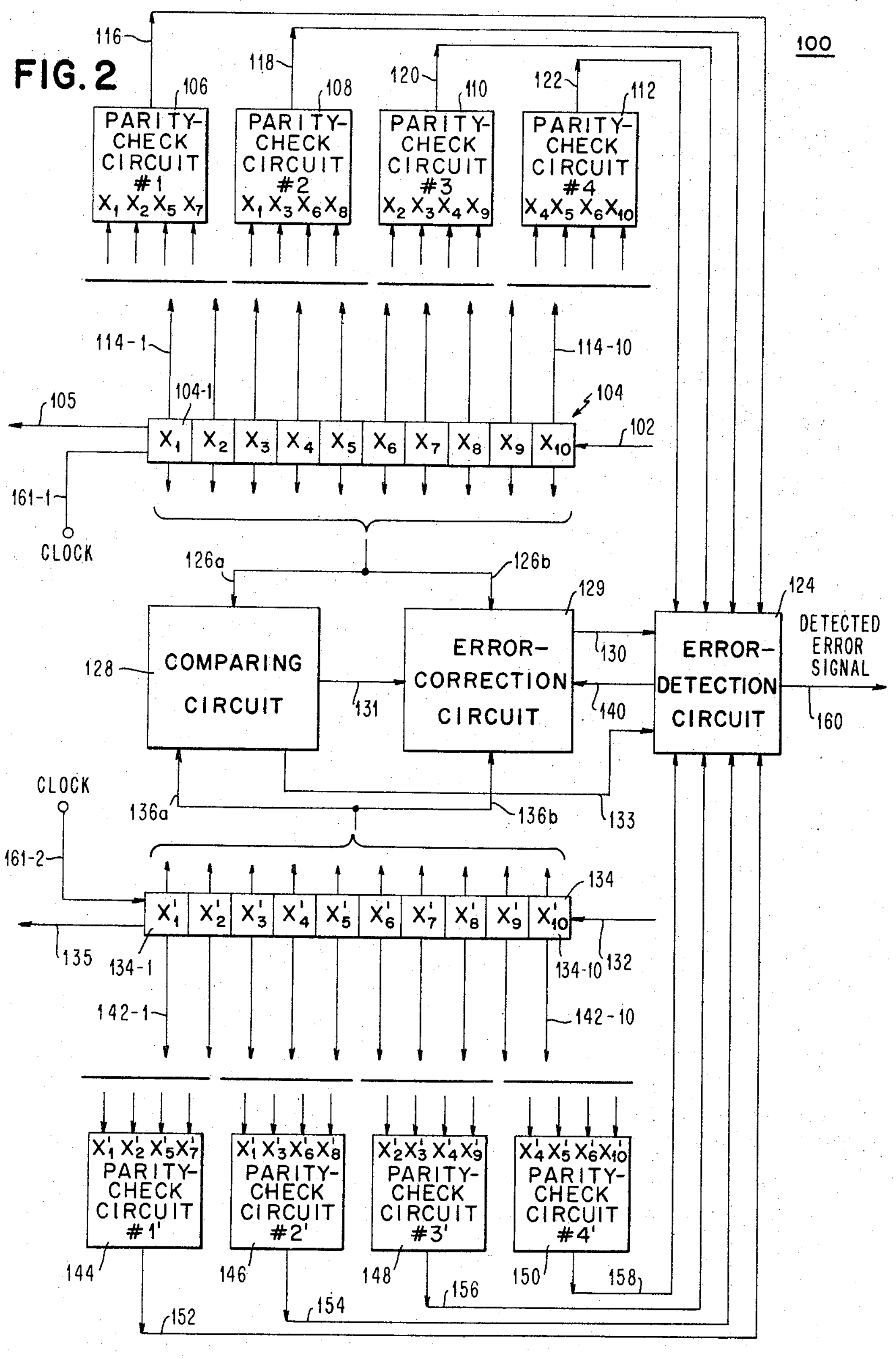
FIG. 2 is a functional block diagram of a specific preferred embodiment of the invention illustrating the use of parity-check circuitry based on a single error correcting Hamming code and logic circuitry to obtain triple error detection and double error correction.
Figures 3, 3D:
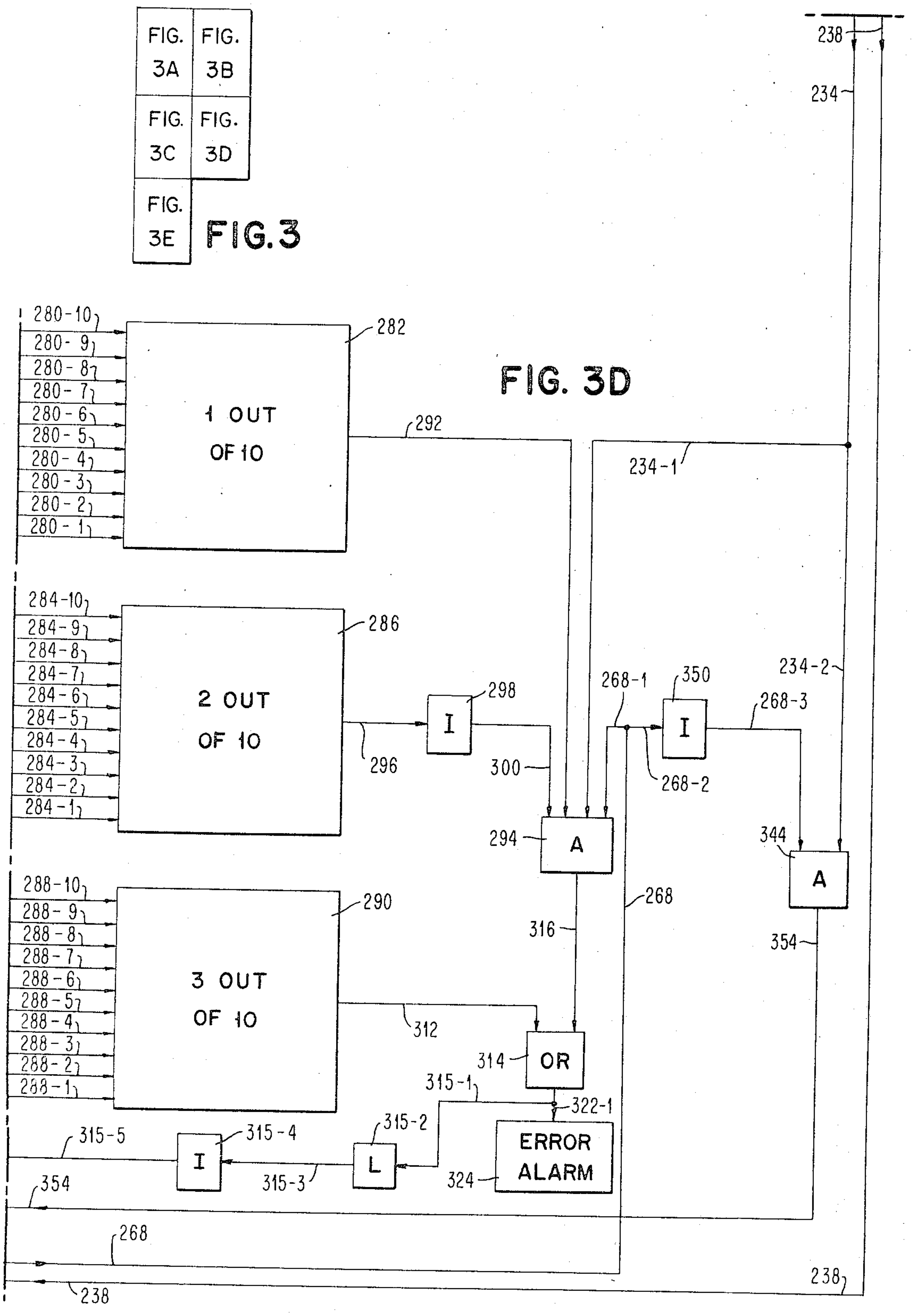

FIG. 3 (which comprises FIGS. 3A, C, D, and E) is a schematic diagram of the preferred specific embodiment presented in FIG. 2 illustrating several aspects thereof in considerable detail.

Figure 4:
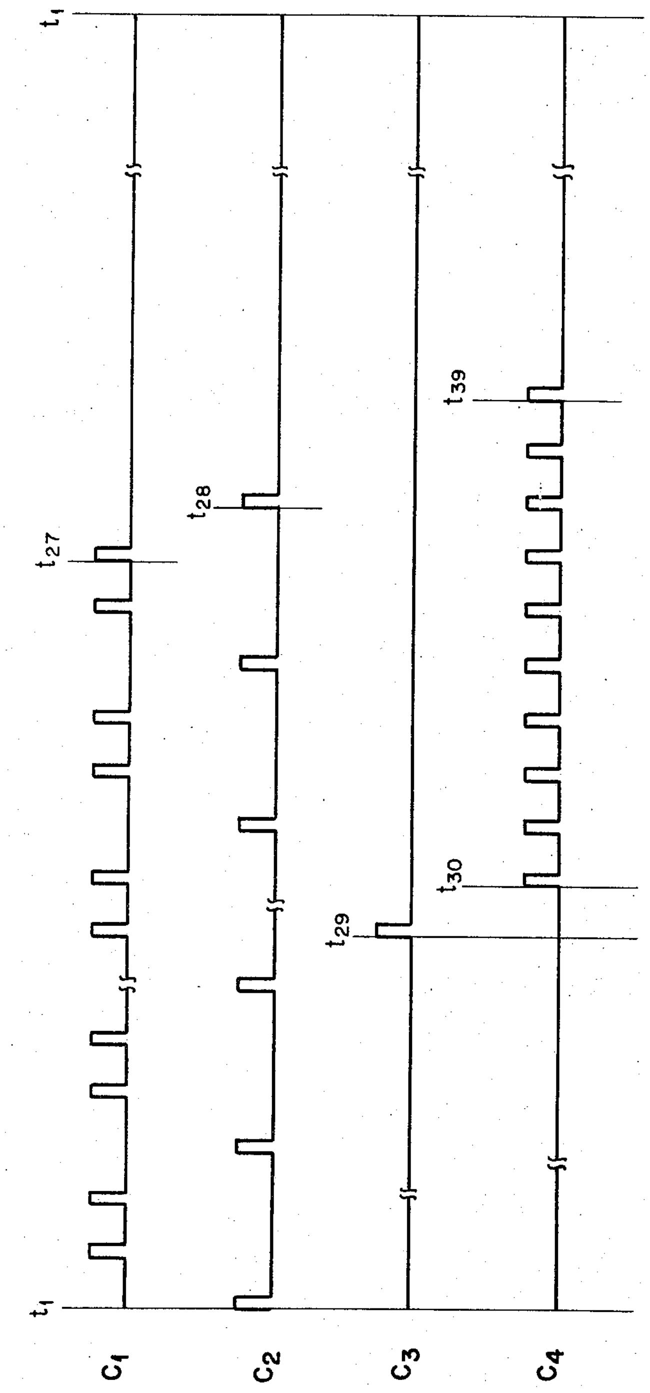

FIG. 4 is a timing diagram for the specific preferred embodiment presented in FIG. 2 and FIG. 3.

Basically, the invention obtains error control for information signals whose information part has inherent information redundancy. The information signals are characterized in the format of the error correcting code and of an error circuitry based on an error-correcting code and comparison logic circuitry are utilized for the error control. A parity-check procedure is utilized to identify the error pattern in the information signals. By a logic procedure, each digital position of the information signals is processed to check if consistency is maintained in the information digit with the inherent redundancy. The cooperative relationship of the procedures characterizes the nature of the error control obtained.

Particularly, for information signals whose information part is represented as sequences of binary digit symbols with two designators or marks per symbol, in the format of codewords from an error correcting code, the invention obtains error control from the cooperative relationship of error detection and correction circuitry and logic circuitry operative on the true and complement information streams of the information signals.

In the specific preferred embodiment of the invention presented herein, a single error-correcting Hamming code is employed as the code format. The codeword length is ten binary symbols with each codeword comprised of six information symbols and four check symbols. An information stream is analyzed by a logic circuit to determine the presence of an error. Respective positions in the true and complement information streams are analyzed by logic circuitry including a one out of ten threshold logic unit, a two out of ten threshold logic unit, a two out of ten majority logic unit, and a three out of ten threshold logic unit.

The practice of the invention for error control of more complex error patterns utilizes an extension of the quantity and quality of the error-correcting code procedure and the comparison logic procedure.

When the information signals are characterized in the format of a single error-correcting Hamming code, the specific preferred embodiment hereof obtains a triple error-detecting and double error-correcting procedure. The following are the three types of double error patterns which may occur where information signals are characterized as binary digits with true and complement marks per digit where an illustrative mark in error is indicated by parenthesis:

(a) There is a double error in either the true stream or the complement stream of marks, e.g., $$X_1\ (X_2)\ (X_3)\ X_4\ X_5\ X_6\ X_7\ X_8\ X_9\ X_{10}$$
$$X_1'\ X_2'\ X_3'\ X_4'\ X_5'\ X_6'\ X_7'\ X_8'\ X_9'\ X_{10}'$$

Error control for the double error pattern is obtained by determining the presence of the errors by the loss of the complement relationship between the true and complement streams. The stream which has the correct information content is read out. If it is the true stream, it is read out stored in its shift register; if it is the complement stream, it is read out from its shift register in the inverted form.

(b) There is a single error in a true mark and a single error in the complement mark of a different binary bit, e.g., $$X_1\ X_2\ (X_3)\ X_4\ X_5\ X_6\ X_7\ X_8\ X_9\ X_{10}$$
$$X_1'\ X_2'\ X_3'\ X_4'\ X_5'\ X_6'\ X_7'\ (X_8')\ X_9'\ X_{10}'$$

Error control is obtained by error-detecting circuitry which detects the error pattern in the true stream and the position is corrected during the readout phase in accordance with the Hamming code structure.

(c) There are single errors in both the true and complement marks of the same binary bit, e.g., $$X_1\ X_2\ X_3\ X_4\ (X_5)\ X_6\ X_7\ X_8\ X_9\ X_{10}$$
$$X_1'\ X_2'\ X_3'\ X_4'\ (X_5')\ X_6'\ X_7'\ X_8'\ X_9'\ X_{10}'$$

Although the complement relationship between the true and complement streams is maintained, the parity checks for both true and complement streams identifies the same mark as erroneous.

The single error-correcting Hamming code which is utilized for the embodiment of the invention is constructed with the following relationships for the binary digits of each codeword:

$$X_1+X_2+X_5+X_7=0$$
$$X_1+X_3+X_6+X_8=0$$
$$X_2+X_3+X_4+X_9=0$$
$$X_4+X_5+X_6+X_{10}=0$$

where $X_1$ to $X_6$ are information binary digits, $X_7$ to $X_{10}$ are check binary digits, and the addition is performed modulo-2. In modulo-2 operation, the addition of binary 1 and binary 0 is performed as follows:

$$0\oplus0=0,\ 1\oplus0=1,\ 0\oplus1=1, \text{ and } 1\oplus1=0$$

The code retains the original complement relationship between the original true and complement streams. The codebook is given in the following Table I whereby the particular error position is identified.

TABLE I

| Syndrome: | Error position |
|---|---|
| 0000 | None |
| 1100 | 1 |
| 1010 | 2 |
| 0110 | 3 |
| 0011 | 4 |
| 1001 | 5 |
| 0101 | 6 |
| 1000 | 7 |
| 0100 | 8 |
| 0010 | 9 |
| 0001 | 10 |

The syndrome for a received input binary sequence is the product of the sequence with the parity-check matrix transposed. For the single error-correcting Hamming code utilized for the embodiment hereof, the parity-check matrix is:

$$H=\begin{bmatrix} 1 & 1 & 0 & 0 & 1 & 0 & 1 & 0 & 0 & 0 \\ 1 & 0 & 1 & 0 & 0 & 1 & 0 & 1 & 0 & 0 \\ 0 & 1 & 1 & 1 & 0 & 0 & 0 & 0 & 1 & 0 \\ 0 & 0 & 0 & 1 & 1 & 1 & 0 & 0 & 0 & 1 \end{bmatrix}$$

In general, the original parity relationship of the true stream is not maintained for the corresponding complementary stream. Illustratively, an equivalent Hamming code may be selected with the true parity-check equations:

$$X_1+X_2+X_5+X_7=0$$
$$X_1+X_3+X_6+X_8=0$$
$$X_1+X_2+X_3+X_4+X_9=0$$
$$X_4+X_5+X_6+X_{10}=0$$

The corresponding set of parity-check equations for the complement stream are:

$$X_1'+X_2'+X_5'+X_7'=0$$
$$X_1'+X_3'+X_6'+X_8'=0$$
$$X_1'+X_2'+X_3'+X_4'+X_9'=1$$
$$X_4'+X_5'+X_6'+X_{10}'=0$$

It should be noted that the third equation employs an odd parity rule instead of an even parity rule. However, the function of the code and the operation of the decoder are not changed in principle as a consequence of employment of different parity rules. The class of codes that employ mixed even and odd parity rules is called coset codes. Coset codes may easily be generated from their corresponding group code (linear code). Patent application S.N. 284,430, by C. V. Freiman, assigned to the assignee hereof describes use of coset codes for error protection and the resemblance of coset codes with group codes.

The prior art practice with a Hamming code is illustrated by U.S. Reissue No. 23,601 (U.S. Patent No. 2,552,629) by R. W. Hamming et al. Illustratively, the equations for the Hamming code are selected as follows. The natural length of a binary Hamming code is $2^m-1$. A parity-check matrix is constructed for the Hamming code by listing all distinct $m$-bit non-zero vectors as columns of the parity-check matrix.

For example, the (15,4) Hamming code parity-check matrix is $$\begin{bmatrix} 1&1&1&1&0&1&1&0&0&1&0&1&0&0&0 \\ 1&1&1&0&1&1&0&1&0&0&1&0&1&0&0 \\ 1&1&0&1&1&0&1&1&1&0&0&0&0&1&0 \\ 1&0&1&1&1&0&0&0&1&1&1&0&0&0&1 \end{bmatrix}$$

To obtain any shortened Hamming code some of the columns in the parity-check matrix are eliminated. Specifically, to obtain a Hamming code of (10,4) the five columns on the left are eliminated and the reduced matrix is obtained. To obtain the parity-check equations, multiply the vector $X_1 X_2 X_3 \ldots X_n$ with the parity-check matrix transposed, i.e., $$(X_1 X_2 \ldots X_{10}) \begin{bmatrix} 1&1&0&0 \\ 1&0&1&0 \\ 0&1&1&0 \\ 0&0&1&1 \\ 1&0&0&1 \\ 0&1&0&1 \\ 1&0&0&0 \\ 0&1&0&0 \\ 0&0&1&0 \\ 0&0&0&1 \end{bmatrix} = 0$$

and set it equal to zero. It should be noticed that it is preferable to delete the columns of the parity-check matrix with more than one 1 in them which permits obtaining the simplest parity-check equations.

The practice of the invention may readily be extended to correct $2t$ errors with a $t$ error-correcting code. In order to construct an error-correcting code which will correct four or more errors, the single error-correcting Hamming code does not suffice for the practice of this invention. The most efficient multiple-error-correcting code known at present is the Bose-Chaudhuri code of which the single error-correcting Hamming code is a special case. A brief discussion will be given below for the implementation of this invention with double and triple error-correcting Bose-Chaudhuri codes for correcting quadruple and sextuple errors in information signals whose information part has one hundred percent balanced redundancy. The general theory of Bose-Chaudhuri codes is taught in the noted book by Peterson entitled "Error Correcting Codes" at page 162 et seq. Generally, for any choice of integers $m$ and $t$, there exists a Bose-Chaudhuri cyclic code of length $2^m-1$ which is capable of correcting any combination of $t$ errors and which requires, at most $m \times t$ parity-check digits. Patent application S.N. 244,702 by R. T. Chien and assigned to the assignee hereof presents teaching of the practice of error detection and correction using Bose-Chaudhuri codes.

It is generally possible in a digital system to obtain a trade between its error-correction and error-detection capabilities. Specifically, the trade is applicable for the cases of independent-error-correcting codes and burst-error-correcting codes. Illustratively, for an independent-error-correcting code, there is a minimum distance $d_{min}$ between the members of all possible codeword pairs. The distance between two binary codewords of a code is the number of respective positions in which they are different.

If the code can correct $e$ independent errors and can detect $f$ independent errors, then $$d_{min}=e+f+1$$

where $f \geqslant e$. The minimum distance $d_{min}$ is six in the case of information signals characterized in the format of a single error-correcting Hamming code, the information part of the signals having one hundred percent inherent balanced redundancy. The following is a tabulation of the possible combinations of error-correction and error-detection for the practice of the invention with the preferred embodiment described herein:

| e | f | d |
|---|---|---|
| 0 | 5 | 6 |
| 1 | 4 | 6 |
| 2 | 3 | 6 |

Figure 1:
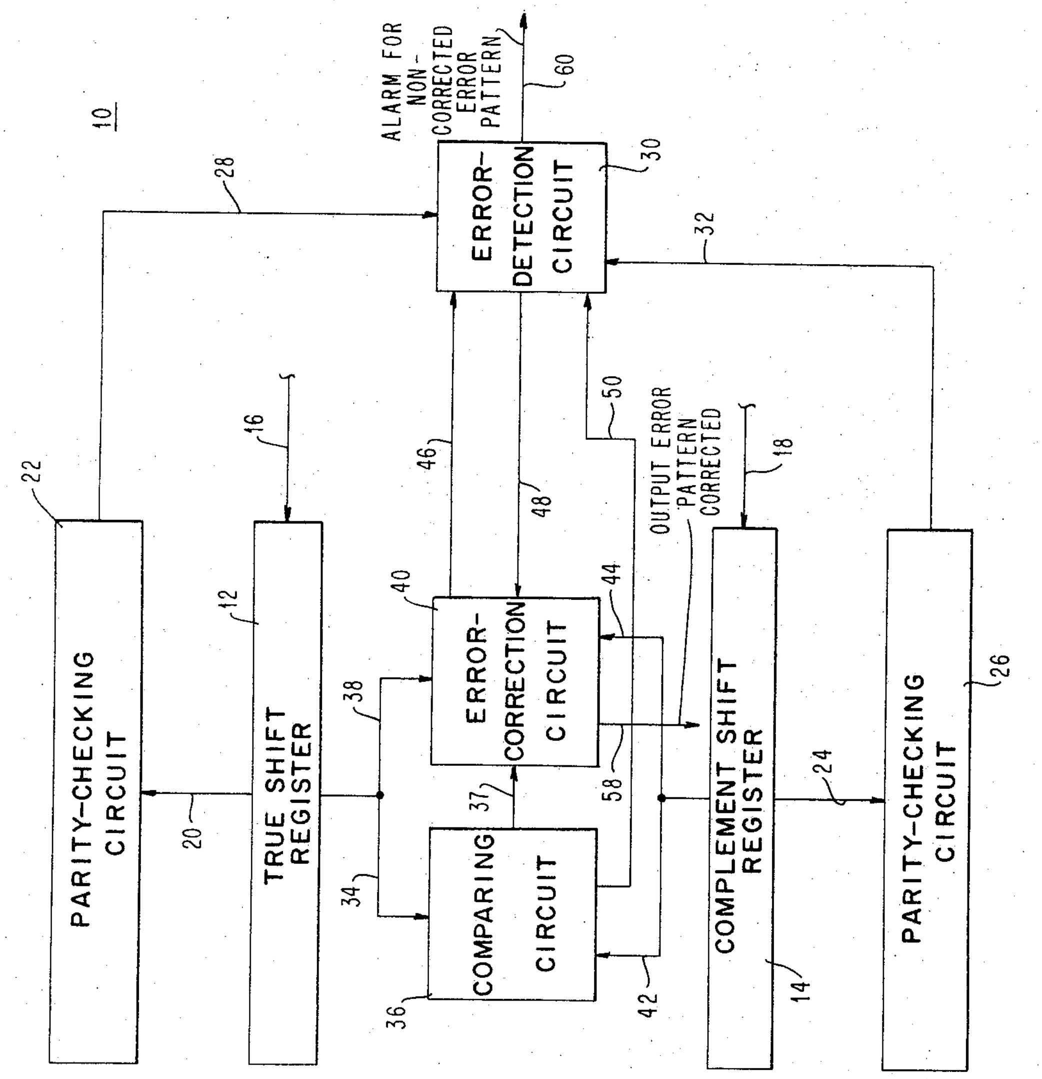
FIG. 1 is a functional block diagram for a general preferred embodiment of the invention illustrating the manner in streams of true and complement marks are established in different shift registers and error control obtained through error-correcting code parity-check circuitry and comparison logic circuitry.

*Description of FIGURE 1*

FIG. 1 is a functional block diagram of a general preferred embodiment 10 of the invention using a Bose-Chaudhuri error-correcting code. It has a true shift register 12 and a complement shift register 14 in which are established the true and complement mark streams via lines 16 and 18, respectively. True shift register 12 communicates via line 20 to parity-checking circuit 22; and complement shift register 14 communicates via line 24 to parity-checking circuit 26. Parity-checking circuit 22 communicates via line 28 to error-detection circuit 30; and parity-checking circuit 26 communicates via line 32 to error-detection circuit 30. True shift register 12 communicates via line 34 to comparing circuit 36 and via line 38 to error correction circuit 40; and complement shift register 14 communicates via line 42 to comparing circuit 36 and via line 44 to error correction circuit 40. Error correction circuit 40 communicates with error-detection circuit 30 via line 46 and error-detection circuit 30 communicates with error correction circuit 40 via line 48. Comparing circuit 36 communicates via line 50 to error-detection circuit 30. Comparing circuit 36 communicates via line 37 to error correction circuit 40. The output of circuit 10 is obtained from error correction circuit 40 via line 58. If the circuit 10 is not able to correct an error pattern detected, an alarm signal is applied to line 60 from error-detector circuit 30.

In operation, the true and complement mark streams are established in $n$-stage true shift register 12 and $n$-stage complement shift register 14 via lines 16 and 18. When the number $n$ mark of the true stream and the number $n$ mark of the complement stream have been established in their respective shift registers, a suitable clock pulse initiates the circuit operation. The marks for each digit are compared in comparing circuit 36 to determine if there has been a loss of the complement relationship. Parity-checking circuits 22 and 26 provide the conventional parity-checks for the content of the true shift register 12 and the complement shift register 14 which are transmitted to error-detector 30 to identify an error pattern in either the true shift register 12 or the complement shift register 14. If the error pattern in either shift register is correctable, an output is provided on output line 58 in corrected form whereas if the detected error pattern is non-correctable by the particular error correcting code implemented, an alarm signal is provided on line 60.

*Description of FIGURE 2*

FIGS. 2 and 3 are functional and schematic diagrams, respectively, of the specific preferred embodiment of the invention described herein which employs a binary representation of two marks per digit and uses a single error correcting Hamming code of six information digits and four check digits.

In the operation of the embodiment 100 shown in functional form in FIG. 2, the true marks and complement marks are established in true and complement shift registers 104 and 134 via lines 102 and 132, respectively. Clock pulses on lines 161–1 and 161–2 cause a comparison to be made between respective true and complement marks by comparing circuit 128 and also transfers the effect of the true and complement mark to the respective parity-check circuits, according to the selected single error-correcting Hamming code.

The comparing circuit 128 communicates with the error-detection circuit 124 via line 133 and with the error-correction circuit 129 via line 131. The error-detection circuit 124 communicates with the error-correction circuit 129 via line 140. The error-correction circuit 129 communicates with the error-detection circuit 124 via line 130. Error-detection circuit 124 either causes correction of erroneous marks in error-correction circuit 129 or causes a signal to be established on line 160 to indicate the detection of an error pattern that is non-correctable by the embodiment 100.

In greater detail, true marks are introduced via line 102 to true shift register 104 and are stored therein in positions $X_1, X_2 \ldots X_{10}$. During the readout phase, the content of shift register 104 is applied to line 105. The complement marks are introduced via line 132 to complement shift register 134 and are stored therein in positions $X_1', X_2' \ldots X_{10}'$. During the readout phase, the content of shift register 134 is applied to line 135. Parity-check circuits 106, 108, 110 and 112, respectively, provide:

$$X_1 \oplus X_2 \oplus X_5 \oplus X_7 = P_7$$
$$X_1 \oplus X_3 \oplus X_6 \oplus X_8 = P_8$$
$$X_2 \oplus X_3 \oplus X_4 \oplus X_9 = P_9$$

and $$X_4 \oplus X_5 \oplus X_6 \oplus X_{10} = P_{10}$$

where $P_7$ to $P_{10}$ are either 0 or 1 dependent on whether the parity-check equation is satisfied or not. Storage cells $X_1, X_2 \ldots X_{10}$ are connected via lines 114–1 to 114–10 to parity-check circuits 106, 108, 110 and 112 as identified for the parity-checks $P_7$ to $P_{10}$. Storage cells 104–1, 104–2, 104–5 and 104–7 ($X_1$, $X_2$, $X_5$ and $X_7$) are connected to the first true parity-check circuit 106. Storage cells 104–1, 104–3, 104–6 and 104–8 ($X_1$, $X_3$, $X_6$ and $X_8$) are connected to the second true-parity check circuit 108. Storage cells 104–2, 104–3, 104–4 and 104–9 ($X_2$, $X_3$, $X_4$ and $X_9$) are connected to the third true parity-check circuit 110. Storage cells 104–4, 104–5, 104–6 and 104–10 ($X_4$, $X_5$, $X_6$ and $X_{10}$) are connected to the fourth true parity-check circuit 112. Parity-check circuits 106, 108, 110 and 112 are connected via lines 116, 118, 120 and 122, respectively, to error-detection circuit 124.

Storage cells 104–1 to 104–10 ($X_1, X_2 \ldots X_{10}$) are connected via lines **126–*a* and 126–*b* to comparing circuit 128 and error-correction circuit 129** respectively.

The complement data bits are introduced via line 132 to complement shift register 134 and are stored in cells 134–1 to 134–10 ($X_1', X_2' \ldots X_{10}'$) thereof. Storage cells 134–1 to 134–10 are connected via lines **136–*a* and 136–*b*, respectively, to comparing circuit 128 and error-correction circuit 129. Storage cells 134–1 to 134–10 are connected via lines 142–1 to 142–10, respectively, to complement parity-check circuits 144, 146, 148 and 150**, respectively, which provide:

$$X_1' \oplus X_2' \oplus X_5' \oplus X_7' = P_7'$$
$$X_1' \oplus X_3' \oplus X_6' \oplus X_8' = P_8'$$
$$X_2' \oplus X_3' \oplus X_4' \oplus X_9' = P_9'$$
$$X_4' \oplus X_5' \oplus X_6' \oplus X_{10}' = P_{10}'$$

Storage cells 134–1, 134–2, 134–5 and 134–7 ($X_1'$, $X_2'$, $X_5'$ and $X_7'$) are connected to the first complement parity-check circuit 144. Storage cells 134–1, 134–3, 134–6 and 134–8 ($X_1'$, $X_3'$, $X_6'$, and $X_8'$) are connected to the second complement parity-check circuit 146. Storage cells 134–2, 134–3, 134–4 and 134–9 ($X_2'$, $X_3'$, $X_4'$, and $X_9'$) are connected to the third complement parity-check circuit 148. Storage cells 134–4, 134–5, 134–6 and 134–10 ($X_4'$, $X_5'$, $X_6'$ and $X_{10}'$) are connected to the fourth complement parity-check circuit 150. Parity-check circuits 144, 146, 148 and 150 are connected via lines 152, 154, 156 and 158 to error-detection circuit 124 from which the detected error signal is obtained on line 160. The detected error signal indicates that an error pattern has occurred that is non-correctable by the embodiment 100.

A determination is made in comparing circuit 128 of the presence or absence of a complement relationship between respective true and complement marks. The error-correction procedure of the predetermined error control is carried out in the error-correction circuit 129.

FIG. 3 is a detailed schematic diagram of the embodiment 100 for detection of double error-correction and triple error-correction as presented in functional block diagram form in FIG. 2. The nature and operation thereof will be described in three levels of increasingly greater detail.

*Brief description of FIGURE 3*

The comparing circuit 272 (FIG. 3C) consists of ten modulo-2 adder units 272–1 to 272–10 and inverters 279–1 to 279–10. If the correct complement relationship exists between the true marks and complement marks in shift registers 200 and 236, there is an output from every one of the modulo-2 adder units 272. If one of the units has no output to indicate that one of the complementing relationships has failed, there will be an output from the one out of ten threshold logic unit 282 (FIG. 3D). If two of the complementing relationships fail, there will be an output both from the one out of ten threshold logic unit 282 and from the two out of ten threshold logic unit 286. If three or more of the complementing relationships fail, there will be also an output from the three out of ten threshold logic unit 290.

Figure 3A:
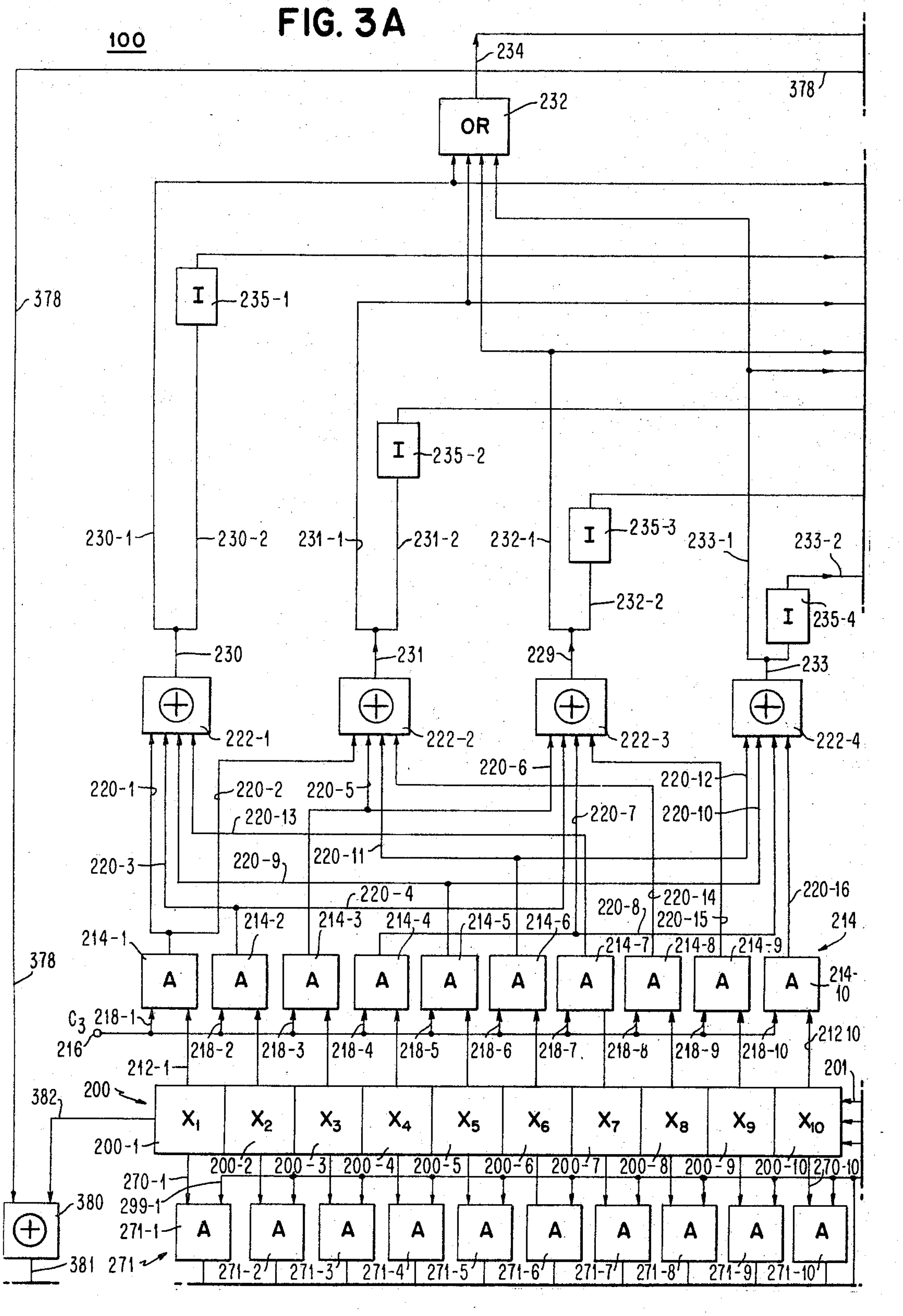

The OR unit 232 (FIG. 3A) provides the output of the parity-checking modulo-2 adder units 222–1 to 222–4 for the true marks. The OR unit 266 (FIG. 3E) provides the output of the parity-checking modulo-2 adder units 254–1 to 254–4. If neither OR unit 232 nor OR unit 266 has an output and there is no output from the three out of ten majority logic unit 290, no error has occurred. The true marks may then be read out from shift register 200 (FIG. 3A).

There is detected but non-correctable error if there is an output frrom the three out of ten majority logic unit 290 which acivates an alarm unit 324. There is also a detected but non-correctable error if there is error in the true marks, error in the complement marks, an output from the one out of ten threshold logic unit 282 and, no output from the two out of ten threshold logic unit 286.

If an error pattern has occurred which is correctable by the embodiment of FIG. 3, there are the following possibilities:

(a) No error has occurred in the true marks and the true marks are read out on line 387.

Figure 3B:
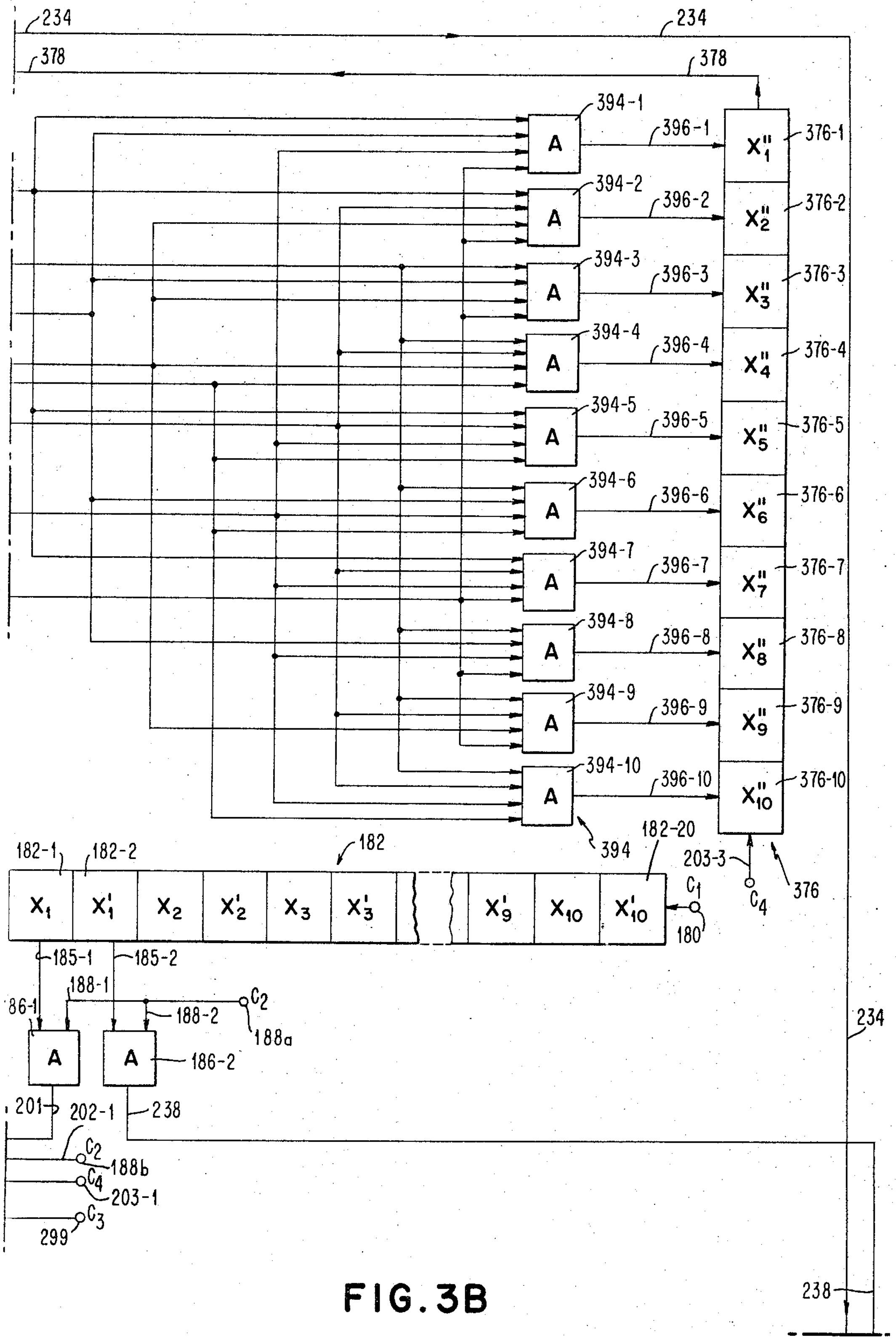
Figure 3C:
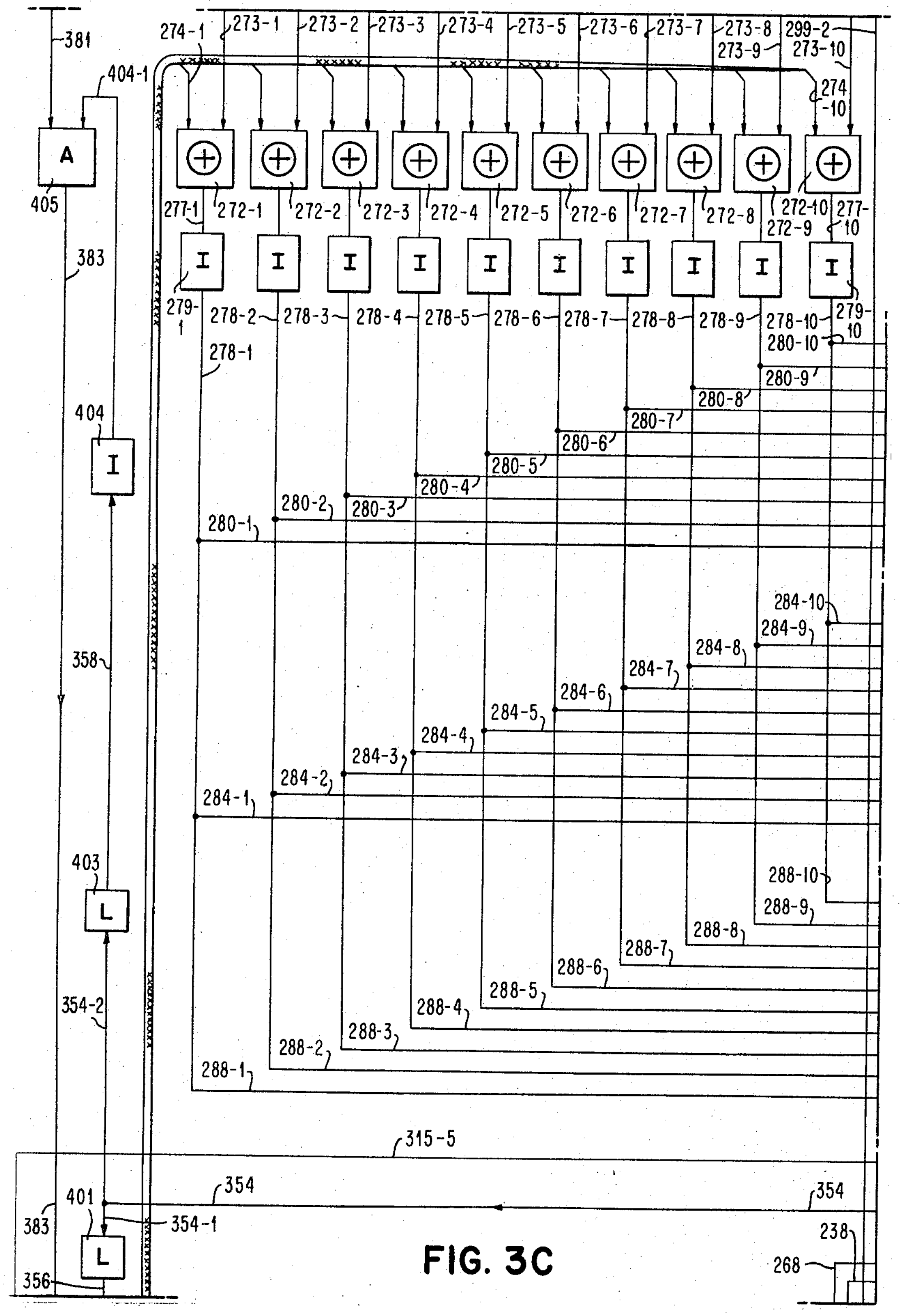
Figure 3E:
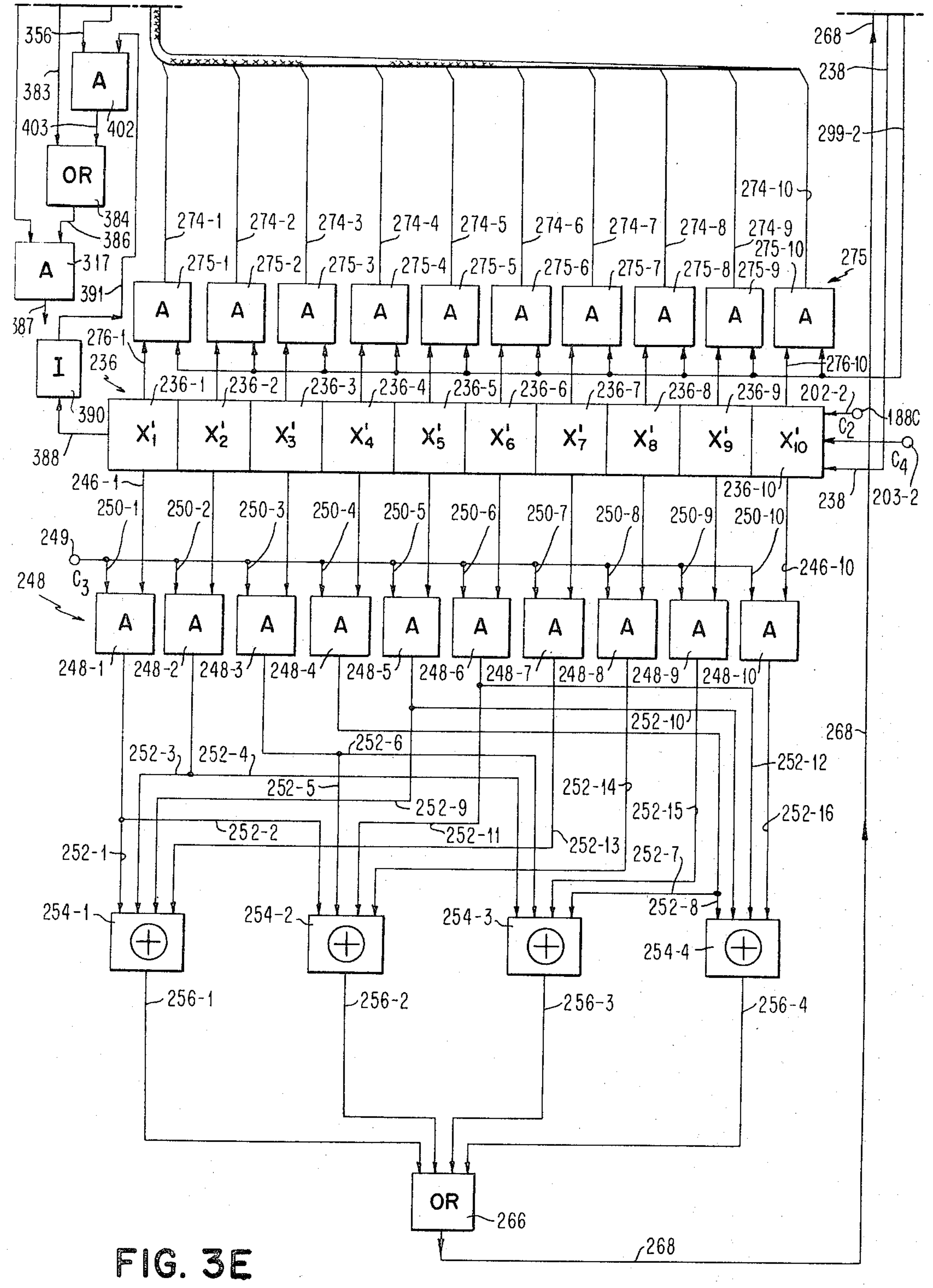

(b) No error has occurred in the complement marks, and the complement marks are read out inverted on line 387 (FIG. 3E).

(c) A single error has occurred in the true marks, and the true marks are read out on line 387 as corrected.

The error correction circuit consists of ten AND units 394–1 to 394–10 and ten shift register storage cells 376–1 to 376–10, each of which correspond to a single error in the respective stage 200–1 to 200–10 of shift register 200. If there is no error in the true marks, there will be no output from any of the AND units 394 and the content of shift register 200 is not changed during read out on line 387. If there is a single error in the true marks, and the true marks are to be read out, the modulo-2 combination of the corresponding stage of true mark register 200 and error-correction register 376 results in the correct output on line 387.

*Timing of FIGURE 3*

The timing of the embodiment 100 of FIG. 3 is in accordance with the timing diagram of FIG. 4, where four different clock pulse patterns are presented. The first clock pulse pattern $C_1$ comprises a series of double pulses which are applied to terminal 180 of buffer shift register 182 (FIG. 3B). The initial operational condition of the embodiment 100 will be described from the time that a binary sequence $X_1$ $X_1'$, $X_2$ $X_2'$ . . . $X_{10}$ $X_{10}'$ is established in buffer shift register 182. Clock pulses $C_1$ are double pairs of pulses which shift the successive true-complement mark pairs into stages 182–1, 182–2, respectively. Thus, clock pulse pairs $C_1$ are repeated nine times for each cycle of operation.

After each true-complement-mark-pair is made available for AND units 186–1 and 186–2, the AND units are enabled by clock pulses $C_2$ applied to terminal 188*a*. As a consequence, the true mark in stage 182–1 of register 182 (FIG. 3B) is established in true shift register 200 via line 201 (FIG. 3A); and the complement mark in stage 182–2 is established in complement shift register 236 via line 238. The clock pulses $C_2$ are repeated ten times for each cycle of operation.

The true marks from buffer shift register 182 are read in true shift register 200 by clock pulses $C_2$ applied to terminal 188*b*; and the complement marks from buffer shift register 182 are read in complement shift registei by clock pulses $C_2$ applied to terminal 188*c*.

Clock pulse $C_3$ occurs at the start of the twenty-ninth time period counting the start of the first time period as the occurrence of the first $C_2$ clock pulse. It is applied to line 299–1 to enable AND units 271 (FIG. 3A); and to line 299–2 to enable AND units 275 to effect the comparison of respective true and complement marks in modulo-2 adder units 272. Clock pulse $C_2$ is also applied to terminal 216 to enable AND units 214 (FIG. 3A) and is also applied to terminal 249 to enable AND units 248 to effect the true parity checking operation and the complement parity checking operation, respectively.

Clock pulses $C_4$, which are ten in number, begin at the start of the thirtieth time period from the start of the cycle of operation. They are applied to terminals 203–1 and 203–2 of shift registers 200 and 236, respectively, to initiate readout of the true and complement streams. Clock pulse $C_4$ is also applied to error-correction shift register 376 (FIG. 3B) to cause the positions therein to be added modulo-2 with the respective positions from true shift register 200 in modulo-2 unit 380.

*General description of FIGURE 3*

As noted above, FIG. 3 is a detailed schematic diagram of the embodiment 100 shown in functional form in FIG. 2. The nature and operation thereof will now be described in somewhat greater detail than above. In the operation of the embodiment 100 illustrated in FIGURE 3, a sequence of true marks $X_1$ to $X_{10}$ is established in storage units 200–1 to 200–10 of shift register 200 (FIG. 3A). They are established therein via line 201 under control of clock pulses $C_2$ applied via line 202–1 to storage cell 200–10. The complement marks $X_1'$ to $X_{10}'$ are established in storage cells 236–1 to 236–10 of complement shift register 236 (FIG. 3E). They are established therein on line 238 under control of clock pulses $C_2$ applied via line 202–2 to storage cell 236–10.

The clock pulses $C_4$ are applied to terminal 216 for AND units 214–1 to 214–10 (FIG. 3A) respectively, and to terminals 249 for AND units 248–1 to 248–10 (FIG. 3E) respectively, to generate appropriate parity check-pulses on line pairs 230 to 233 and on lines 256–1 to 256–4, respectively.

The error detection and correction procedures are initiated when the ten true marks $X_1$ to $X_{10}$ are established in storage cells 200–1 to 200–10 of true shift register 200 and the ten complement marks $X_1'$ to $X_{10}'$ are established in storage cells 236–1 to 236–10 of complement shift register 236. Appropriate clock pulses $C_3$ are applied to terminals 216 for AND units 214–1 to 214–10 and to terminal 249 for AND units 248–1 to 248–10. Accordingly, parity-check pulses are established on line pairs 230 to 233 and lines 256–1 to 256–4 in accordance with the selected single error-correcting Hamming code. The parity-check pulse on each line is determined according to the Hamming code by the input marks which exist in the shift register 200 or 236. If there is an even number of 1 marks applied to a particular modulo-2 adder unit 222, the output thereof will be 0. However, if there is an odd number of 1 marks, the output will be 1.

At the same time that the parity-check lines 230 to 233 and 256–1 to 256–4 are being established in their error detecting conditions, the respective storage cells of true shift register 200 and complement shift register 236 are compared by modulo-2 adder units 272 through AND units 271–1 to 271–10 and 275–1 to 275–10 (FIG. 3C) respectively. If there is a difference in the marks in the respective storage cells of the true and complement shift registers 200 and 236, the output of the respective modulo-2 adder unit is a 1. However, if an error has occurred in one of the marks of a binary digit, the marks in the corresponding storage cells of the two shift registers will be the same and the output from the respective modulo-2 adder unit will be 0. The true and complement streams in shift registers 200 and 236 are read out by clock pulses $C_4$. The error correction takes place between the thirtieth and forty-second time periods.

If an error does not exist in any position in either the true or complement shift registers, information is read out with AND unit 402 (FIG. 3E) blocking the complement marks coming from shift register 236. The contents of shift register 376 (FIG. 3B) will be all zeros for this case, and the output is unchanged.

If an error has occurred that can be detected by the embodiment 100 but not corrected thereby, an error alarm signal is initiated for error alarm 324 via line 322 from OR unit 314 (FIG. 3D). One input to OR unit 314 is three out of ten threshold logic unit 290 via line 312 (FIG. 3D). The other input thereto is from AND gate 294 via line 316. The inputs to AND unit 294 are: one out of ten threshold logic unit 282 via line 292; two out of ten threshold logic unit 286 via line 296 in series with inverter 298 through line 300; OR unit 232 (FIG. 3A) through lines 234 and 234–1; OR unit 266 (FIG. 3E) through lines 268 and 268–1. In this case the input binary sequence has been determined to be incorrect but not within the capability of the embodiment to recover the correct information binary digits.

If an error has occurred that can be corrected by the embodiment 100, there are three possible error patterns:

(1) There is either a single or a double error present in the true marks but no error is present in the complement marks. There is an output from AND unit 344 (FIG. 3D) on line 354. The inputs to AND unit 344 are OR gate 266 from lines 268 and 268–2 in series with inverter unit 350 and line 268–3. The other input to AND unit 344 is OR unit 232 via lines 234 and 234–2. The output of AND unit 354 is sent to latches 401 and 403. Latch 401 (FIG. 3C) is set and holds AND unit 402 open for ten clock cycles, so that the complement marks may be read out from shift register 236. The complement marks are transmitted on the series path of line 388 (FIG. 3E), inverter 390, AND unit 402, OR unit 384, line 386, and AND unit 317 to line 387. Simultaneously, latch 403 (FIG. 3C), closes and keeps AND unit 405 closed for ten clock cycles through use of inverter 404. Thus, the incorrect true marks are prevented from being read out and the correct complement marks from complement shift register 236 (FIG. 3E), are inverted and are read out instead.

(2) There is either a single or a double error in the complement marks but there is no error in the true marks. In this case the input to AND unit 344 (FIG. 3D), via line 268–3 is a zero. Hence, latches 401 and 403 stay inactivated and AND unit 405 (FIG. 3C) is activated through inverter 404 and output information arrives on output line 387 from the true register 200.

(3) There is a single error in one of the true marks and there is a single error in one of the complement marks. The errors are corrected by use of shift register 376 (FIG. 3B) and modulo-2 adder unit 380.

*Detailed description of FIGURE 3*

The nature and operation of embodiment 100 presented in FIG. 3 will now be described in considerable detail with reference to the timing diagram of FIG. 4.

The information signals to be processed by the embodiment 100, represented herein as $$X_1 X_1' X_2 X_2' X_3 X_3' \ldots X_{10} X_{10}'$$

are applied to input terminal 180 and are established in stages 182–1 to 182–20 of shift register 182. As noted hereinbefore, the two mark per binary digit format may characterize a binary 1 as 10 and a binary 0 as 01. Therefore, the $X_i$ marks are termed the "true" marks and the $X_i'$ marks are termed the complement marks. Stages 182–1 and 182–2 of shift register 182 are connected via lines 185–1 and 185–2 to AND units 186–1 and 186–2, respectively. Consequently, the true marks $X_i$ are established via line 201 in true shift register 200, and the complement marks $X_i'$ are established via line 238 in complement shift register 236.

Shift register 200 has storage cells 200–1 to 200–10, in which the true marks $X_1$ to $X_{10}$, respectively, are established. The true marks $X_1$ to $X_{10}$ are introduced to shift register 200 via line 201, along with the shift pulses $C_2$ on line 203–1 which establish them in stages 200–1 to 200–10, respectively. Storage cells 200–1 to 200–10 of shift register 200 are connected via lines 212–1 to 212–10 to AND units 214–1 to 214–10, respectively, which are enabled by a timing pulse $C_3$, according to the timing diagram of FIG. 4, applied to terminal 216 of lines 218–1 to 218–10.

Output lines 220 from AND units 214 are connected to modulo-2 adder units 222. Lines 220–1 and 220–2 from AND units 214–1 are connected to modulo-2 adder units 222–1 and 222–2, respectively. Lines 220–3 and 220–4 from AND unit 214–2 are connected to inputs of modulo-2 adder units 222–1 and 222–3, respectively. The lines 220–5 and 220–6 from AND unit 214–3 are connected to the inputs of modulo-2 adder units 222–2 and 222–3, respectively. Lines 220–7 and 220–8 from AND unit 214–4 are connected to inputs of modulo-2 adder units 222–3 and 222–4, respectively. Lines 220–9 and 220–10 are connected to inputs of modulo-2 adder units 222–1 and 222–4, respectively. Lines 220–11 and 220–12 are connected to inputs of modulo-2 adder units 222–2 and 222–4, respectively. Lines 220–13 to 220–16 are connected to inputs of modulo-2 adder units 222–1 to 222–4, respectively. Therefore, modulo-2 adder unit 222–1 has an output on line 230 only if $$X_1 \oplus X_2 \oplus X_5 \oplus X_7 \neq 0$$

modulo-2 adder unit 222–2 has an output on line 231 only if $$X_1 \oplus X_3 \oplus X_6 \oplus X_8 \neq 0$$

modulo-2 adder unit 222–3 has an output on line 232 only if $$X_2 \oplus X_3 \oplus X_4 \oplus X_9 \neq 0$$

and modulo-2 adder unit 222–4 has an output on line 233 only if $$X_4 \oplus X_5 \oplus X_6 \oplus X_{10} \neq 0$$

The output line 230 of modulo-2 adder unit 222–1 is connected: via line 230–1 to OR unit 232 and to the inputs of AND unit 394–1, 394–2, 394–5, and 394–7; and to the AND units 394–3, 394–4, 394–6, 394–8, 394–9, and 394–10 via line 230–2 through inverter unit 235–1. The output line 231 of modulo-2 adder unit 222–2 is connected: via line 231–1 to OR unit 232 and to the inputs of AND units 394–1, 394–3, 394–6, and 394–8; and to the inputs of AND units 394–2, 394–4, 394–5, 394–7, 394–9, and 394–10 via line 231–2 through inverter unit 235–2. The output line 232 of modulo-2 adder unit 222–3 is connected: via line 232–1 to OR unit 232 and to the inputs of AND units 394–2, 394–3, 394–4 and 394–9; and to AND units 394–1, 394–5, 394–6, 394–7, 394–8, and 394–10 via line 232–2 through inverter unit 235–3. The output line 233 of modulo-2 adder unit 222–4 is connected: via line 233–1 to OR unit 232 and to AND units 394–4, 394–5, 394–6 and 394–10; and to AND units 394–1, 394–2, 394–3, 394–7, 394–8 and 394–9 via line 233–2 through inverter 235–4.

The output of OR unit 232 is applied to line 234. Thus, an output on line 234 indicates that an error has occurred in the true marks $X_1$ to $X_{10}$ which were established in true shift register 200.

The outputs of AND units 394–1 to 394–10 are connected to the inputs 376–1 to 376–10, respectively, of error-correction shift register 376. Clock pulses $C_4$ are applied on line 203–3 to error-correction shift register 376. The positions $X_1''$ to $X_{10}''$ are applied from shift register 376 on line 378. As will be explained more fully hereinafter, the position in error is a 1 while correct positions are 0.

The complement marks $X_1'$ to $X_{10}'$ which have been established in shift register 182 are established in shift register 236. They are applied from stage 182–2 to AND unit 186–2 via line 185–2 and established in shift register 236 via line 238 by clock pulses $C_2$ on line 202–2. Clock pulses $C_2$ applied to terminal 188a also enable AND unit 186–2. Shift register cells 236–1 to 236–10 of shift register 236 are connected via lines 246–1 to 246–10, respectively, to the inputs of AND units 248–1 to 248–10. AND units 248–1 to 248–10 are enabled simultaneously by timing pulses $C_3$ (FIG. 4) on lines 250–1 to 250–10 applied to terminal 249 thereof. The outputs of AND units 248–1 to 248–10 are connected to the inputs of modulo-2 adder units 254–1 to 254–4 via lines 252–1 to 252–16 according to the following pattern: AND unit 248–1 via lines 252–1 and 252–2 to modulo-2 adder units 254–1 and 254–2, respectively, AND unit 248–2 via lines 252–3 and 252–4 to modulo-2 adder units 254–1 and 254–3, respectively; AND units 248–3 via lines 252–5 and 252–6 to modulo-2 adder units 254–2 and 254–3, respectively; AND unit 248–4 via lines 252–7 and 252–8 to modulo-2 adder units 254–3 and 254–4, respectively; AND unit 248–5 via lines 252–9 and 252–10 to modulo-2 adder units 254–1 and 254–4, respectively; AND unit 248–6 via lines 252–11 and 252–12 to modulo-2 adder units 254–2 and 254–4, respectively; AND unit 248–7 via line 252–13 to modulo-2 adder unit 254–1; AND unit 248–8 via line 252–14 to modulo-2 adder unit 254–2; AND unit 248–9 via line 252–15 to modulo-2 adder unit 254–3; and AND unit 248–10 via line 252–16 to modulo-2 adder unit 254–4.

Modulo-2 adder units 254–1 to 254–4 are connected via lines 256–1 to 256–4 to OR unit 266 whose output is applied to line 268. Thus, a 1 output from modulo-2 adder unit 254–1 indicates that $$X_1' \oplus X_2' \oplus X_5' \oplus X_7' \neq 0$$

A 1 output from modulo-2 adder unit 254–2 indicates that $$X_1' \oplus X_3' \oplus X_6' \oplus X_8' \neq 0$$

A 1 output from modulo-2 adder unit 254–3 indicates that $$X_2' \oplus X_3' \oplus X_4' \oplus X_9' \neq 0$$

A 1 output from modulo-2 adder unit 254–4 indicates that $$X_4' \oplus X_5' \oplus X_6' \oplus X_{10}' \neq 0$$

A comparison is obtained by modulo-2 adder unit 272 between the respective marks established in true shift register 200 and the complement marks established in complement shift register 236. A modulo-2 adder unit 272–1 to 272–10 provides an output if the two inputs thereto are 0 and 1. If the two inputs are each 0 or are each 1, the output of the modulo-2 adder unit is 0. The outputs of modulo-2 adder units 272–1 to 272–10 are connected via lines 277–1 to 277–10 to inverter units 279–1 to 279–10, respectively.

Storage cells 200–1 to 200–10 of true shift register 200 are connected via lines 270–1 to 270–10 to AND units 271–1 to 271–10, respectively, which are enabled by clock pulses $C_3$ on lines 299–1 thereof. The outputs of AND units 271–1 to 271–10 are connected to the inputs of modulo-2 adder units 272–1 to 272–10 via lines 273–1 to 273–10, respectively.

Storage cells 236–1 to 236–10 of complement shift register 236 are connected via lines 276–1 to 276–10 to AND units 275–1 to 275–10, respectively. The outputs of AND units 275–1 to 275–2 are connected to inputs of modulo-2 adder units 272–1 to 272–10, respectively, via lines 274–1 to 274–10, AND units 275–1 to 275–10 are enabled by a clock pulse $C_3$ on line 299–2 applied to terminal 299. The outputs of inverter units 279–1 to 279–10 are applied to lines 278–1 to 278–10, respectively. Inverter units 279–1 to 279–10 are connected via lines 278–1 to 278–10 and lines 280–1 to 280–10, respectively, to the inputs of one out of ten threshold logic circuit 282. Inverter units 279–1 to 279–10 are connected via lines 278–1 to 278–10 and lines 284–1 to 284–10, respectively, to the inputs of two out of ten threshold logic circuit 286. Inverter 279–1 to 279–10 are connected via lines 278–1 to 278–10 through lines 288–1 to 288–10, respectively, to the inputs of three out of ten threshold logic circuit 290.

A threshold logic unit provides an output when a particular number of the inputs thereto are activated. Thus, one out of ten threshold logic unit 282 provides an output on line 292 when one of the input lines 280–1 to 280–10 provides a binary 1. There will be a binary 1 on a line 280–1 to 280–10 only when the complement relationship is not present for respective position of shift registers 200 and 236. Similarly, two out of ten threshold logic units 286 provides an output on line 296 when two of the input lines 284–1 to 284–10 provide binary 1's; and three out of ten threshold logic unit provides an output when three of the input lines 288–1 to 288–10 provide binary 1's. One out of ten threshold logic circuit 282 is connected via line 292 to an input of AND unit 294. Two out of ten threshold logic circuit 286 is connected via line 296, inverter 298, and line 300 to an input of AND unit 294. The output of OR unit 232 (from true shift register 200) is connected via lines 234 and 234–1 to an input of AND unit 294. The output of OR unit 266 (from complement shift register 236) is connected via lines 268 and 268–1 to an input of AND unit 294. The output of AND unit 294 is connected to an input of OR unit 314 and the output of threshold logic circuit 290 is connected via line 312 to the other input thereof. The output from OR unit 314 is connected via line 322–1 to error alarm 324, and is connected via the series path of line 315–1, latch unit 315–2, line 315–3, inverter unit 315–4, and line 315–5 to an input of AND unit 317. When the cycle of operation is over, latch unit 315–2 is reset.

Therefore, the error alarm indicates that a non-correctable error has occurred when the one out of ten threshold logic unit indicates that one position has the true complement relationship changed; and both true and complement registers 200 and 236 contain at least one error as indicated by the outputs from OR units 232 and 266. Further, when the error alarm 324 is activated, the output line 387 may not be activated. Illustratively, the following is an error pattern which would cause error alarm 324 to be activated (an erroneous position is indicated by parenthesis):

$$X_1\ (X_2)\ X_3\ X_4\ X_5\ X_6\ X_7\ X_8\ X_9\ X_{10}$$
$$X_1'\ (X_2')\ X_3'\ (X_4')\ X_5'\ X_6'\ X_7'\ X_8'\ X_9'\ X_{10}'$$

The output of true OR unit 232 is connected via lines 234 and 234–2 to an input of AND unit 344; the output of complement OR unit 266 is connected via the series path of line 268, line 268–2, inverter unit 350, and line 268–3 to the other input of AND unit 344. The output of AND unit 344 is connected via lines 354 and 354–1 to set latch unit 401, and via lines 354 and 354–2 to set latch unit 403. Thus, latch units 401 and 403 are set if there is an error in the marks of the true shift register 200 and no error in the marks of the complement shift register 236 as indicated by an output and no output, respectively, from OR units 232 and 266. When the cycle of operation is completed the latch units 401 and 403 are reset.

The nature and operation of the error correction shift register 376 will now be described. As described hereinbefore, the outputs of the modulo-2 adder units 222–1 to 222–4 are connected to the inputs of AND units 394–1 to 394–10, respectively. The connections are in accordance with the following Table II:

TABLE II

| Modulo-2 Adder Unit | AND Unit | | | | | | | | | |
|---|---|---|---|---|---|---|---|---|---|---|
| | 394–1 | 394–2 | 394–3 | 394–4 | 394–5 | 394–6 | 394–7 | 394–8 | 394–9 | 394–10 |
| 222–1 | 1 | 1 | 0 | 0 | 1 | 0 | 1 | 0 | 0 | 0 |
| 222–2 | 1 | 0 | 1 | 0 | 0 | 1 | 0 | 1 | 0 | 0 |
| 222–3 | 0 | 1 | 1 | 1 | 0 | 0 | 0 | 0 | 1 | 0 |
| 222–4 | 0 | 0 | 0 | 1 | 1 | 1 | 0 | 0 | 0 | 1 |
| Syndrome | 1100 | 1010 | 0110 | 0011 | 1001 | 0101 | 1000 | 0100 | 0010 | 0001 |

The tabulated binary sequences are the syndromes identified from the following parity check matrix which characterizes the error positions in the true marks.

$$H = \begin{array}{cccccccccc} X_1 & X_2 & X_3 & X_4 & X_5 & X_6 & X_7 & X_8 & X_9 & X_{10} \\ \hline 1 & 1 & 0 & 0 & 1 & 0 & 1 & 0 & 0 & 0 \\ 1 & 0 & 1 & 0 & 0 & 1 & 0 & 1 & 0 & 0 \\ 0 & 1 & 1 & 1 & 0 & 0 & 0 & 0 & 1 & 0 \\ 0 & 0 & 0 & 1 & 1 & 1 & 0 & 0 & 0 & 1 \end{array}$$

The outputs of AND units 394–1 to 394–10 are connected via lines 396–1 to 396–10 to stages 376–1 to 376–10 of shift register 376. The stages 376–1 to 376–10 of shift register 376 have positions $X_1''$ to $X_{10}''$ which are 0 unless an error is determined by AND units 394–1 to 394–10 to be present in the true marks in shift register 200. If such an error is determined to be present in shift register 200, the appropriate position $X_1''$ to $X_{10}''$ is changed to a 1. The remaining connections of the embodiment 100 of FIG. 3 will now be presented. Clock pulses $C_4$ are applied via terminal 203–1 to the shift register 200 and via terminal 203–2 to the shift register 236 to cause them to shift out the stored true and complement streams via lines 382 and 388, respectively. Line 382 is connected to an input of modulo-2 adder unit 380. The output of shift register 376 is applied via line 378 to the other input of modulo-2 adder unit 380. This modulo-2 adder unit 380 presents on line 381 the corrected mark for each position of true shift register 200. Illustratively, if $X_3$ is a 0 but should be a 1, the stage $X_3''$ of error-correction shift register 376 will be set to a 1. Thus, $$X_3 \oplus X_3'' = 0 + 1 = 1$$

The output of latch unit 403 is connected via line 358, inverter 404 and line 404–1 to the other input of AND unit 405. Since latch unit 403 will only be set if there is an error in the complement shift register, the AND unit 405 will be enabled when the complement register is not to be read out. Therefore, the corrected true marks from true shift register 200 are passed from AND unit 405 via the series path line 383, OR unit 384, line 386, and AND unit 317 to the output line 387.

Latch unit 401 is connected via lines 356 to an input of AND unit 402. The output from complement shift register 236 is presented via the series path of line 388, inverter unit 390, and line 391 to the other input of AND unit 402. Latch unit 401 will be set only when the output of AND unit 344 indicates that no error is present in the complement marks in complement shift register 236 and that there is an error in the true marks in the true register 200. Thus, the complement marks are converted to corresponding true marks by inverter unit 390 and are presented as the output on line 387 via the series path of AND unit 402, OR unit 384, and AND unit 317.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for predetermined error control of digital information signals characterized in the format of a Bose-Chaudhuri error-correcting code, the information part of said signals having inherent balanced information redundancy, comprising, in combination:
   - input means to store the information streams of said information signals;
   - first logic means to process said information streams on the digit basis to check if consistency is maintained with said inherent balanced information redundancy;
   - second logic means for error-detection and error-correction of said signals in accordance with said Bose-Chaudhuri error-correcting code; and
   - output means responsive to said first logic means and said second logic means to provide said information from said information streams in accordance with the nature of said error control.

2. The apparatus of claim 1 in which said error control effect error-correction of $e$ independent errors and error-detection of $f$ independent errors in accordance with the relationship $$d_{\min} = e + f + 1$$

where $d_{\min}$ is the minimum distance of the codewords of said format and $f \geqslant e$.

3. Apparatus for predetermined error control of digital information signals characterized in the format of a single error-correcting Hamming code, the information part of said signals having inherent balanced information redundancy, comprising, in combination:
   - input means to store the information streams of said information signals;
   - first logic means to process said information streams on the digit basis to check if consistency is maintained with said inherent balanced information redundancy;
   - second logic means for error-detection and error-correction of said signals in accordance with said single error-correcting Hamming code; and
   - output means responsive to said first logic means and said second logic means to provide said information from said information streams in accordance with the nature of said error control.

4. The apparatus of claim 3 in which said error control effects error-correction of $e$ independent errors and error-detection of $f$ independent errors in accordance with the relationship $$d_{\min} = e + f + 1$$

where $d_{\min}$ is the minimum distance of the codewords of said format and $f \geqslant e$.

5. Apparatus for predetermined error control of digital information signals characterized in the format of an error-correcting code, the information part of said signals having one hundred percent inherent balanced information redundancy, said signals being represented as sequences of binary symbols with two designators per symbol, comprising, in combination:
   - input means to separate the integral true and complement information streams of said information signals;
   - first logic means connected between said information streams to indicate quantitatively the nature of an error pattern therein;
   - second logic means in accordance with said code to determine presence of an error pattern in said information streams;
   - output means responsive to said first logic means and said second logic means to provide said information from said information streams in accordance with the nature of said error control.

6. The apparatus of claim 5 in which said error control effects error-correction of $e$ independent errors and error-detection of $f$ independent errors in accordance with the relationship $$d_{\min} = e + f + 1$$

where $d_{\min}$ is the minimum distance of the codewords of said format and $f \geqslant e$.

7. Apparatus for predetermined error control of digital information signals characterized in the format of a Bose-Chaudhuri error-correcting code, the information part of said signals having one hundred percent inherent balanced information redundancy, comprising, in combination:
   - shift register means to store the true and complement information streams of said signals;
   - first logic means connected between said information streams for comparison of said information streams;
   - second logic means for error-correction and error-detection of said information signals in accordance with said Bose-Chaudhuri error-correcting code, said second logic means including $m \times t$ parity checking units for said true information stream and $m \times t$ parity checking units for said complement information stream, where $2^m = n + 1$, where $n$ = total number of binary digits per code word, $mt$ = number of checking binary digits per code word, and $t$ = number of errors in said codeword correctable by said Bose-Chaudhuri code; and
   - output means response to said first logic means and said second logic means to provide said information from said information streams in accordance with the nature of said error control.

8. The apparatus of claim 7 in which said error control effects error-correction of $e$ independent errors and error-detection of $f$ independent errors in accordance with the relationship $$d_{min}=e+f+1$$

where $d_{min}$ is the minimum distance of the codewords of said format and $f \geqslant e$.

9. Apparatus for predetermined error control of digital information signals characterized in the format of a single error-correcting Hamming code, the information part of said signals having inherent balanced information redundancy, said signals being represented as sequences of binary signals with true and complement designators per symbol, comprising, in combination:

input means to separate the true and complement information streams of said information signals;

first logic means for comparison of respective positions of said information streams connected between said information streams to provide a quantitative indication of said error patterns;

second logic means in accordance with said error correcting code to determine the presence of errors in said information streams;

register means connected to said second logic means to identify the error pattern in at least one of said information streams; and output means responsive to said first logic means, said second logic means, and said register means to provide said information from said streams in accordance with the nature of said error control.

10. The apparatus of claim 9 in which said error control effects error-correction of $e$ independent errors and error-detection of $f$ independent errors in accordance with the relationship $$d_{min}=e+f+1$$

where $d_{min}$ is the minimum distance of the codewords of said format and $f \geqq e$.

11. Apparatus for predetermined error control of digital information signals characterized in the format of an error correcting Hamming code, the infomation part of said signals having one hundred percent inherent balanced information redundancy, comprising, in combination:

first shift register means and second shift register means to store the true and complement information streams, respectively, of said signals;

first logic means for comparison of said information streams having a modulo-2 adder circuitry to indicate if said complement relationship has been altered and a threshold logic unit to indicate each number of possible failures of complement errors up to the total number of errors detectable by said code;

second logic means for error-detection and error-correction of said information signals in accordance with said error-correcting Hamming code; and output means responsive to said first shift register means, said second shift register means, said first logic means, and said second logic means to provide said information from one of said streams in accordance with the nature of said error control.

12. The apparatus of claim 11 in which said error control effects error-correction of $e$ independent errors and error-detection of $f$ independent errors in accordance with the relationship $$d_{min}=e+f+1$$

where $d_{min}$ is the minimum distance of the codewords of said format and $f \geqq e$.

13. Apparatus for predetermined error control of digital information signals characterized in the format of a single error-correcting Hamming code, the information part of said signals having one hundred percent inherent balanced information redundancy, comprising, in combination:

first shift register means and second shift register means adapted to store the true and complement information streams, respectively, of said information signals;

first logic means connected to both said first and second shift registers for determining if said complement relationship is maintained at every respective position;

error-correction circuit means connected to both said shift registers to provide error-correction of the information stream in at least one said shift register in accordance with the capability of said error-correcting code;

a first plurality of parity-check circuits connected to said first shift register to provide the parity-checks for said true information stream in accordance with said error correcting code;

a second plurality of parity-check circuits connected to said second shift register to provide the parity-checks for said complement information stream in accordance with said error correcting code; and error-detection circuit means connected to both said first plurality of parity-check circuits and said second plurality of parity-check circuits, said error-detection circuit means being also connected to both said comparing circuit means and said error correction-circuit means;

whereby said error-detection means provides an indication of non-correctable errors in said information streams and said error-correction-circuit corrects errors in at least one of said streams within the capability of said error correcting code.

14. The apparatus of claim 13 in which said first shift register and said second shift register stores said information signals as a received true codeword and as a received complement codeword of said error-correcting code with ten marks per codeword represented as $$X_1\ X_2\ X_3\ X_4\ X_5\ X_6\ X_7\ X_8\ X_9\ X_{10}$$

and $$X_1'\ X_2'\ X_3'\ X_4'\ X_5'\ X_6'\ X_7'\ X_8'\ X_9'\ X_{10}'$$

said first plurality of parity check-circuits being four in number which provide, respectively, an indication that one or more of the following parity check equations is not satisfied $$X_1 \oplus X_2 \oplus X_5 \oplus X_7=0$$
$$X_1 \oplus X_3 \oplus X_6 \oplus X_8=0$$
$$X_2 \oplus X_3 \oplus X_4 \oplus X_9=0$$
$$X_4 \oplus X_5 \oplus X_6 \oplus X_{10}=0$$

and said second plurality of parity-check circuits being four in number which provide, respectively, an indication that one or more of the following parity-check equations is not satisfied $$X_1' \oplus X_2' \oplus X_5' \oplus X_7'=0$$
$$X_1' \oplus X_3' \oplus X_6' \oplus X_8'=0$$
$$X_2' \oplus X_3' \oplus X_4' \oplus X_9'=0$$
$$X_4' \oplus X_5' \oplus X_6' \oplus X_{10}'=0$$

15. Apparatus for predetermined error control of digital information characterized in the format of a single error-correcting Hamming code, the information part of said signals having one hundred percent inherent balanced information redundancy in the form of a true mark and a complement mark per binary digit, comprising, in combination:

buffer input register means adapted to store a codeword of said information signals represented as $$X_1\ X_1',\ X_2\ X_2',\ \ldots\ X_{10}\ X_{10}'$$

where $X_1, \ldots X_{10}$ are true marks and $X_1', \ldots X_{10}'$ are complement marks;

first shift register means and second shift register means connected to said buffer register and adapted to store the integral true information stream and complement stream of said codeword represented as $$X_1\ X_2\ X_3\ X_4\ X_5\ X_6\ X_7\ X_8\ X_9\ X_{10}$$

and $$X_1'\ X_2'\ X_3'\ X_4'\ X_5'\ X_6'\ X_7'\ X_8'\ X_9'\ X_{10}'$$

modulo-2 adder circuitry connected between said first and said second shift registers to determine any respective positions where said true and complement relationship is not present;

first, second, and third threshold logic circuits connected to said modulo-2 adder circuitry to provide an indication of one out of ten, two out of ten, and three out of ten of said non-presence of said true and complement relationship at said respective positions;

a first plurality of parity-check circuits connected to said first shift register to provide an indication of the failure of one or more of the following parity-check equations $$X_1 \oplus X_2 \oplus X_5 \oplus X_7 = 0$$
$$X_1 \oplus X_3 \oplus X_6 \oplus X_8 = 0$$
$$X_2 \oplus X_3 \oplus X_4 \oplus X_9 = 0$$
$$X_4 \oplus X_5 \oplus X_6 \oplus X_{10} = 0$$

a second plurality of parity-check circuits connected to said second shift register to provide an indication of the failure of one or more of the following parity-check equations $$X_1' \oplus X_2' \oplus X_5' \oplus X_7' = 0$$
$$X_1' \oplus X_3' \oplus X_6' \oplus X_8' = 0$$
$$X_2' \oplus X_3' \oplus X_4' \oplus X_9' = 0$$
$$X_4' \oplus X_5' \oplus X_6' \oplus X_{10}' = 0$$

an error position identification circuit connected to said parity-check matrix for said single error-correcting to said parity-check circuits in accordance with the parity-check matrix for said single error-correcting Hamming code represented as $$H = \begin{bmatrix} 1 & 1 & 0 & 0 & 1 & 0 & 1 & 0 & 0 & 0 \\ 1 & 0 & 1 & 0 & 0 & 1 & 0 & 1 & 0 & 0 \\ 0 & 1 & 1 & 1 & 0 & 0 & 0 & 0 & 1 & 0 \\ 0 & 0 & 0 & 1 & 1 & 1 & 0 & 0 & 0 & 1 \end{bmatrix}$$

and an error-correction shift register connected to said AND circuitry to indicate which position in said first shift register is in error, said positions in said error-correcton shift register being represented as $$X_1''\ X_2''\ X_3''\ X_4''\ X_5''\ X_6''\ X_7''\ X_8''\ X_9''\ X_{10}''$$

a modulo-2 adder unit connected to said error-correction shift register and to said first shift register to provide the modulo-2 sum of respective positions of said latter registers represented as $$X_1 + X_1'',\ X_2 + X_2'',\ \ldots\ X_{10} + X_{10}''$$

and output means to provide said complement stream inverted, said true information stream corrected, or an indication of a non-correctable error.

References Cited

UNITED STATES PATENTS

| | | | |
|---|---|---|---|
| Re. 23,601 | 12/1952 | Hamming et al. | 340—146.1 |
| 2,849,532 | 8/1958 | Henning | 340—146.1 |
| 2,954,432 | 9/1960 | Lewis | 340—146.1 |
| 2,993,956 | 7/1961 | Steeneck | 340—146.1 |
| 3,051,784 | 8/1962 | Neumann | 340—146.1 |

MALCOLM A. MORRISON, *Primary Examiner.*

ROBERT C. BAILEY, *Examiner.*

M. P. ALLEN, M. J. SPIVAK, V. SIBER, *Assistant Examiners.*